(12) United States Patent
Dec

(10) Patent No.: US 8,958,961 B2
(45) Date of Patent: Feb. 17, 2015

(54) CONTINUOUSLY VARIABLE TRANSMISSION

(75) Inventor: Andrzej Dec, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 289 days.

(21) Appl. No.: 13/613,612

(22) Filed: Sep. 13, 2012

(65) Prior Publication Data

US 2013/0158823 A1    Jun. 20, 2013

Related U.S. Application Data

(63) Continuation-in-part of application No. 13/328,630, filed on Dec. 16, 2011.

(51) Int. Cl.
*G06F 7/00* (2006.01)
*G06F 17/00* (2006.01)
*G06F 19/00* (2011.01)

(52) U.S. Cl.
USPC ............... 701/58; 474/29; 474/30; 474/31; 474/49; 474/52

(58) Field of Classification Search
USPC .......... 701/51, 54, 58, 60, 61; 474/29, 30, 31, 474/49, 52
See application file for complete search history.

(56) References Cited

U.S. PATENT DOCUMENTS

| | | | | |
|---|---|---|---|---|
| 4,541,821 A * | 9/1985 | Sakakibara | ...................... | 474/17 |
| 4,735,598 A * | 4/1988 | Moroto et al. | ................... | 474/29 |
| 4,993,284 A * | 2/1991 | Oshiage | ........................... | 477/48 |
| 5,080,639 A * | 1/1992 | Sakakibara et al. | ........... | 475/211 |
| 5,378,198 A * | 1/1995 | Moroto et al. | .................... | 474/8 |
| 5,514,047 A * | 5/1996 | Tibbles et al. | ................... | 477/46 |
| 5,795,261 A | 8/1998 | Speicher et al. | | |
| 6,050,911 A * | 4/2000 | Feuchter et al. | ................ | 474/12 |
| 6,120,399 A | 9/2000 | Okeson | | |
| 6,244,986 B1 | 6/2001 | Mori et al. | | |
| 6,278,915 B1 * | 8/2001 | Deguchi et al. | ................. | 701/22 |
| 6,908,405 B2 * | 6/2005 | Otaki et al. | ...................... | 474/39 |
| 6,997,832 B2 * | 2/2006 | Onogi | ............................... | 474/8 |
| 7,004,860 B2 * | 2/2006 | Yoshida et al. | ................. | 474/20 |
| 7,101,311 B2 | 9/2006 | Deguchi | | |
| 8,460,138 B2 * | 6/2013 | Unno | .............................. | 474/29 |
| 2006/0276281 A1 * | 12/2006 | Jonckheere et al. | ........... | 474/29 |
| 2011/0220453 A1 | 9/2011 | Mueller | | |
| 2011/0263363 A1 | 10/2011 | Schoenfelder | | |
| 2011/0277577 A1 | 11/2011 | Roberge et al. | | |
| 2012/0238384 A1 * | 9/2012 | Lee et al. | ........................ | 474/25 |
| 2013/0190955 A1 * | 7/2013 | Halwes | ........................... | 701/22 |

FOREIGN PATENT DOCUMENTS

GB    2177169 A    1/1987

* cited by examiner

*Primary Examiner* — Khoi Tran
*Assistant Examiner* — Jaime Figueroa
(74) *Attorney, Agent, or Firm* — Jeffrey A. Thurnau, Esq.; Paul N. Dunlap, Esq.

(57) ABSTRACT

A CVT transmission comprising a shaft journalled to a housing, a first sheave fixed to the shaft, a second sheave moveable parallel to an axis of rotation of the shaft, the second sheave locked in rotating relation with the first sheave by a first sheave member cooperatively engaged with a second sheave receiving member, the second sheave receiving member disposed at a helical angle (HA) with respect to the axis of rotation, a sprocket journalled to the housing, the sprocket threadably engaged with a movable member, a bearing disposed between the movable member and the second sheave, the movable member engaged with the housing whereby movement of the movable member is parallel with the axis of rotation, an electric actuator engaged with the sprocket, and the second sheave is axially movable upon a rotation of the sprocket.

14 Claims, 5 Drawing Sheets

CONTINUOUSLY VARIABLE TRANSMISSION

REFERENCE TO RELATED APPLICATIONS

This continuation-in-part claims priority from U.S. non-provisional patent application Ser. No. 13/328,630 filed Dec. 16, 2011.

FIELD OF THE INVENTION

The invention relates to a CVT, and more particularly to a CVT having a motorized controller actuating a movable sheave for adjusting a transmission ratio.

BACKGROUND OF THE INVENTION

Conventional snowmobile drive trains incorporate a continuously variable transmission (CVT) having a driving pulley that is operatively coupled to the engine crankshaft and a driven pulley coupled to a driven shaft. The driving pulley acts as a clutch and includes a centrifugally actuated adjusting mechanism through which the drive ratio of the CVT is varied progressively as a function of the engine speed and the output torque at the driven pulley. Typically, the driven shaft is a transverse jackshaft which drives the input member of a chain and sprocket reduction drive. The output of reduction drive is coupled to one end of the axle on which are located the drive track drive sprocket wheels.

Although a centrifugal CVT provides many advantages, the fact that the drive ratio of the CVT is directly related to the engine speed causes some disadvantages. One such disadvantage is that the calibration of the driving pulley is always linked with the maximum power output of the engine. Although this results in great acceleration characteristics for the snowmobile, when the snowmobile operates at cruising speeds it results in the engine operating at a greater speed than necessary, high fuel consumption, high noise levels, and a lot of vibrations being transmitted to the riders of the snowmobile.

Representative of the art is US patent application no. 2011/0277577 which discloses a method of managing a transmission ratio with an assisted CVT with a governed engine to emulate a hydrostatic transmission and prevent a drivebelt abuse is provided, the method comprising: providing a reference power source rotational speed, using the assisted CVT to transmit rotatable motion between a power source and a drive mechanism, managing a torque of the power source to maintain a substantially even rotational speed upon a power source load variation and modulating a transmission ratio of the assisted CVT to change the rotational speed of the drive mechanism. A system and a vehicle having such a drivebelt abuse preventing mechanism is also provided.

What is needed is a CVT having a motorized controller actuating a movable sheave for adjusting a transmission ratio. The present invention meets this need.

SUMMARY OF THE INVENTION

The primary aspect of the invention is to provide a CVT having a motorized controller actuating a movable sheave for adjusting a transmission ratio.

Other aspects of the invention will be pointed out or made obvious by the following description of the invention and the accompanying drawings.

The invention comprises a CVT transmission comprising a shaft journalled to a housing, a first sheave fixed to the shaft, a second sheave moveable parallel to an axis of rotation of the shaft, the second sheave locked in rotating relation with the first sheave by a first sheave member cooperatively engaged with a second sheave receiving member, the second sheave receiving member disposed at a helical angle (HA) with respect to the axis of rotation, a sprocket journalled to the housing, the sprocket threadably engaged with a movable member, a bearing disposed between the movable member and the second sheave, the movable member engaged with the housing whereby movement of the movable member is parallel with the axis of rotation, an electric actuator engaged with the sprocket, and the second sheave is axially movable upon a rotation of the sprocket.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
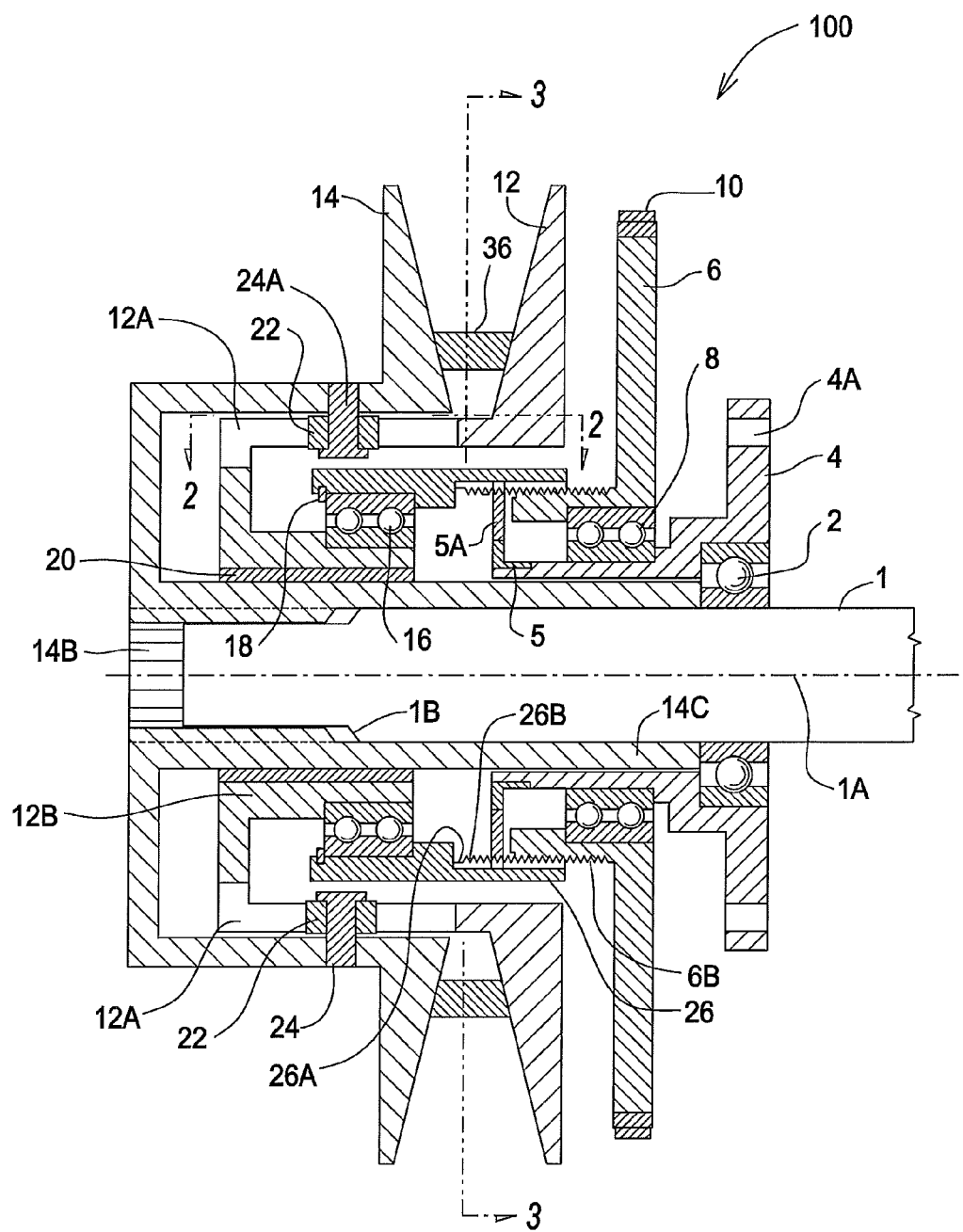
FIG. 1 is a cross-sectional view of inventive transmission along lines 1-1 in FIG. 5.

As shown in FIG. 1, the invention comprises an input shaft 1 journalled to a housing 4 by bearing 2. Housing 4 comprises holes 4A which allow the transmission to be attached to a chassis (not shown) or other frame using fasteners (not shown). Input shaft 1 rotates around axis of rotation 1A.

Input shaft 1 comprises splines 1B that transfer torque to mating splines 14B of sheave 14. Hence, sheave 14 is rigidly mounted to an end of shaft 1 and rotates therewith. Sheave 14 also comprises a cylindrical stem 14C which cooperatively and coaxially engages shaft 1 along its length. Stem 14C is preferable a press-fit so that sheave 14 is retained on shaft 1.

Movable sheave 12 is slidingly engaged with an inner surface of sheave 14. Low-friction bushing 20 is press-fit to an inner surface of stem 12B of sheave 12. Bushing 20 slides on an external surface of stem 14C.

Figure 2:
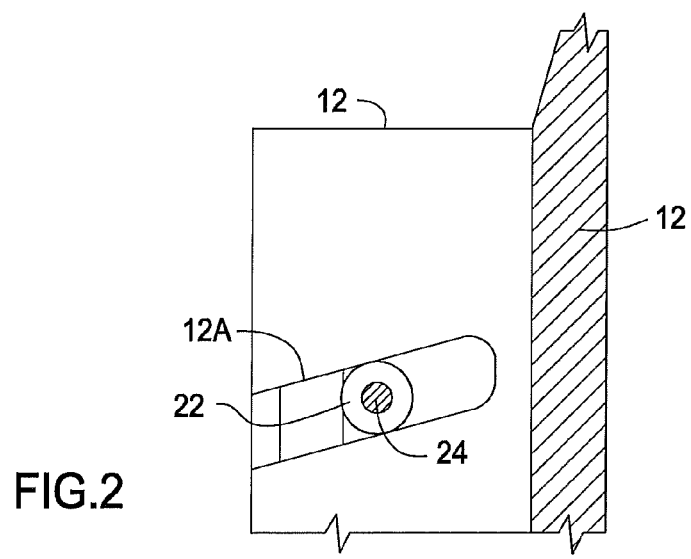
FIG. 2 is a partial sectional view taken along lines 2-2 in FIG. 1.

As shown in FIG. 1 and FIG. 2, roller 22 rotates around a pin 24. Pin 24 is rigidly fixed to sheave 14. Pin 24 projects radially inward from sheave 14 and is normal to the axis of rotation 1A of shaft 1. Movable sheave 12 comprises slots 12A that guide the sheave along rollers 22. In the instant embodiment of this invention there are two rollers and two pins spaced 180 degrees from each other on sheave 14.

In an alternate embodiment roller 22 may be removed from pin 24. Pin 24 is coated with a low friction material to facilitate sliding of pin 24 within a slot 12A. To further facilitate sliding of pin 24 within slot 12A, surfaces of slot 12A are also coated with a low friction material.

An angular contact double row bearing 8 is press-fit on housing 4 and is press-fit into sprocket 6 allowing sprocket 6 to rotate around housing 4 and axis 1A. A second angular contact double row bearing 16 is press-fit on stem 12B.

A tube 26 is press-fit over the outer race of bearing 16. Bearing 16 is secured in place in tube 26 by a snap ring 18.

One end of tube 26 comprises an internal thread 26B that engages a cooperating external thread 6B on sprocket 6.

Figure 3:
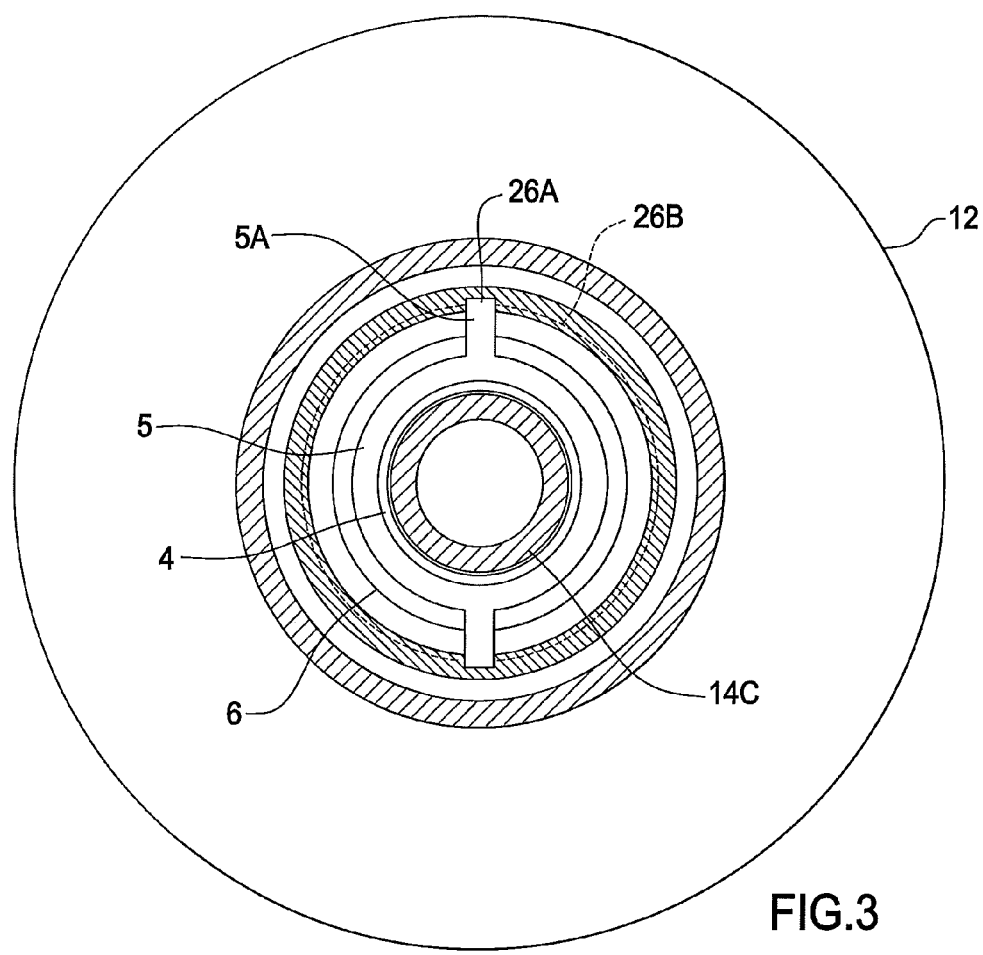
FIG. 3 is a partial sectional view taken along lines 3-3 in FIG. 1.

A sleeve member 5 is fixedly attached to one end of housing 4. Sleeve member 5 comprises radial projections 5A. Projections 5A move within cooperating slots or keyways 26A, see FIG. 3. Keyways 26A are formed in the inside diameter of tube 26. Keyways 26A extend parallel to the axis of rotation 1A along the major axis of input shaft 1.

Figure 5:
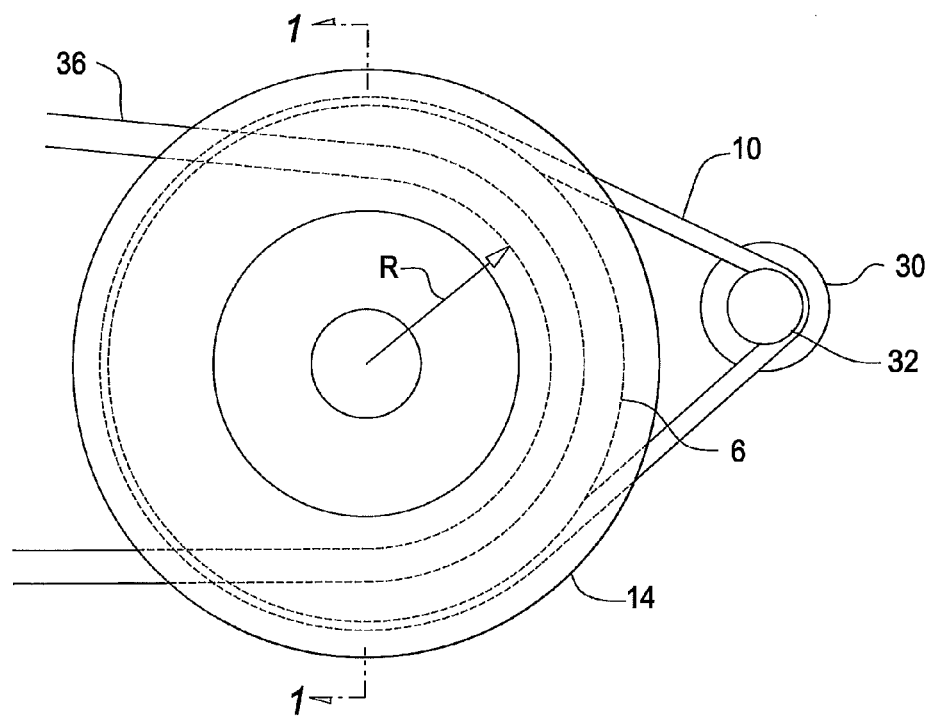
FIG. 5 is a front view of the inventive transmission.

Belt 10 trains around sprocket 6 and a sprocket 32 of electric motor 30, see FIG. 5. In the preferred embodiment belt 10 is of a toothed type. Electric motor 30 is preferably mounted to a chassis or frame (not shown). V-belt 36 is engaged between sheave 12 and sheave 14.

Description of Operation

V-belt 36 operates at a radius R as shown in FIG. 5. Radius R is variable according to the axial position of movable sheave 12. When the distance between sheaves 12 and decreases, the radius R increases. When the distance between the sheaves 12 and 14 increases, the radius R decreases. The change of radius R changes the transmission ratio, that is, it changes the angular speed of the clutch connected via belt 36 to the instant electronically controlled CVT clutch.

The change of axial position of movable sheave 12 is accomplished as follows. Electric motor 30 rotates sprocket 6 via belt 10. External thread 6B rotates with sprocket 6 while engaged with internal thread 26B of tube 26. Given their connection to the immovable housing 4, projections 5A are stationary. Projections 5A cooperatively move within keyways 26A as tube 26 moves axially under the influence of rotation of sprocket 6. Since projections 5A are stationary, tube 26 is prevented from rotating about axis 1A. This results in threads 6B moving tube 26 axially. Bearing 16 engaged with tube 26 and thereby to sheave 12 transmits axial force. An axial movement of tube 26 results in axial movement of sheave 12. Bearing 16 allows sheave 12 to rotate around axis 1.

Roller 22 attached to sheave 14 transmits torque from sheave 14 to sheave 12. The relative axial movement between sheave 14 and sheave 12 is determined in part by the orientation of slot 12A which guides roller 22. In the preferred embodiment the orientation of slot 12A is helical with a helix angle HA of approximately 20 degrees, see FIG. 4. The helix angle of slot 12A aids in axially moving sheave 12 thereby resulting in lower power requirements from electric motor 30 as described herein. HA may be in the range of about 5 degrees to about 50 degrees.

Moveable sheave 14 may typically be biased away from stationary sheave 12 via a spring (not shown). Motor 30 must be sized to overcome the spring biasing force. With the design of slot(s) 12A, the size, power, and/or cost, and/or combinations thereof, of motor 30 may be generally reduced compared to if slot(s) 12A are generally parallel to longitudinal axis 1A.

Figure 4:
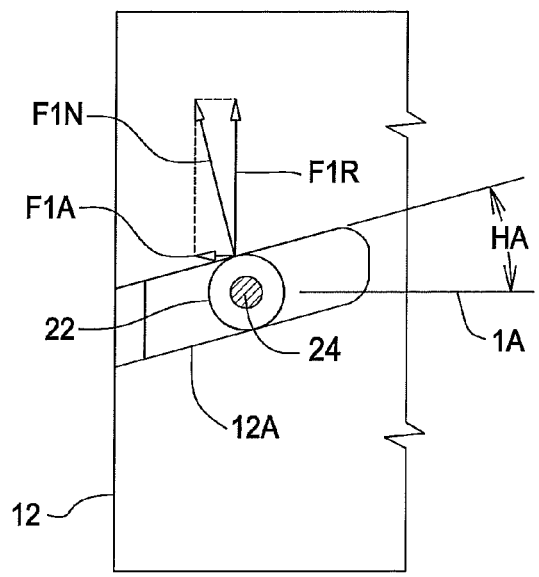
FIG. 4 is a detail of FIG. 2 showing force distribution.

As shown in FIG. 4, a force vector F1R generated by a belt 36 tensile load at the point of contact between roller 22 and slot 12A comprises a normal force component F1N with respect to the slot and an axial force component F1A. Axial force F1A urges sheave 12 toward sheave 14. The larger the helix angle HA, the larger the axial force F1A thereby resulting in less power requirement from electric control motor 30 to move sheave 12 toward sheave 14.

Decreasing the distance between sheave 12 and sheave 14 requires the electric motor to overcome the radial force of the belt 36 which is trying to force the sheaves apart. Reducing the size of the electric motor 30 enhances power output by reducing parasitic power losses.

Figure 6:
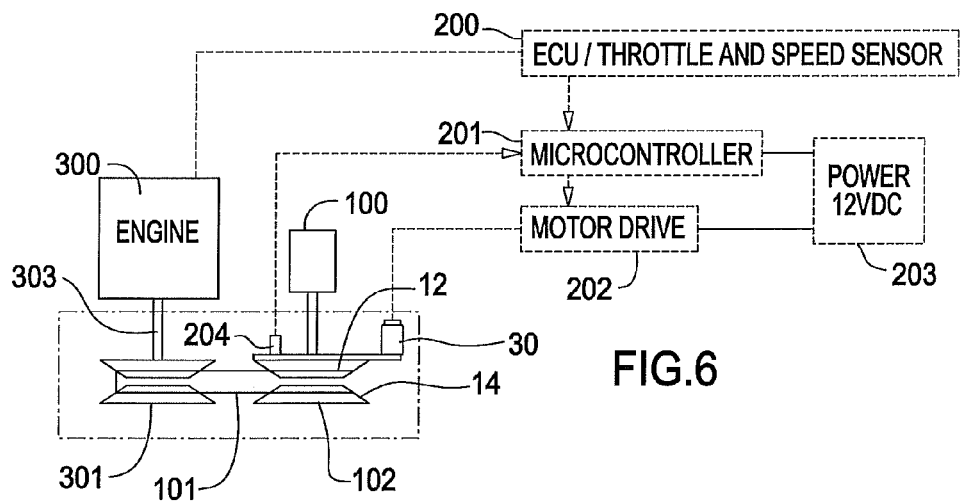
FIG. 6 is a control schematic of the CVT system.

FIG. 6 is a control schematic of the CVT system. Engine 300 and transmission 100 are connected via a CVT belt 101 known in the art. Engine 300 comprises any primary driver including an internal combustion engine. A driver clutch 301 is connected to an engine shaft 303. A driven clutch 102 is connected to the transmission 100 as described in FIG. 1.

A microcontroller 201 is connected to sensor 204. Sensor 204 detects a position of sprocket 10, see FIG. 1. A motor drive 202 is connected to motor 30. A 12V DC power source is connected to the microcontroller and motor drive. The microcontroller 201 is further connected to the motor drive 202 whereby the microcontroller sends a control signal to the motor drive. The control signal causes the motor drive 202 to properly position sprocket 10, thereby setting a desired transmission ratio.

An ECU and throttle and speed sensor 200 detect and control an engine operation in a manner known in the art. The microcontroller 201 processes a signal from the ECU 200 in order to determine the proper control signal for the motor 30.

Figure 7:
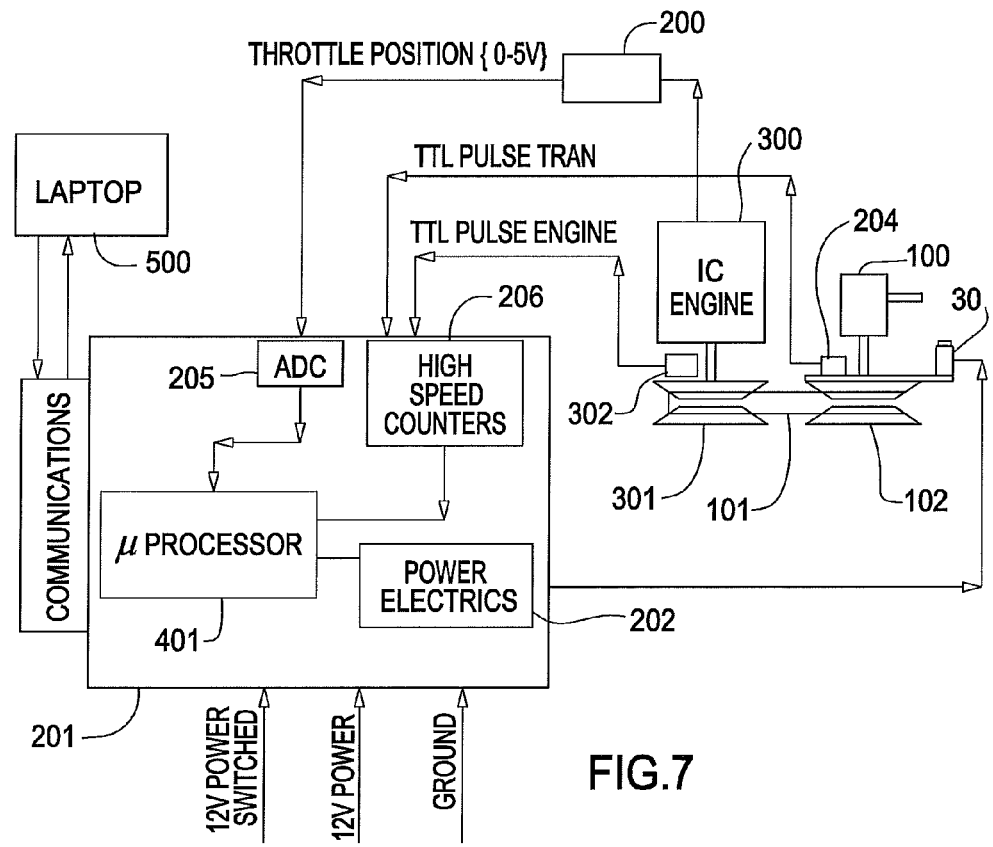
FIG. 7 is a control schematic of the CVT system.

FIG. 7 is a control schematic of the CVT system. Microcontroller 201 comprises a microprocessor 401; analogue to digital converter 205, high speed counters 206. Microprocessor 401 may be programmed by a user in a manner known in the art to program transmission shift points based upon engine speed. A laptop computer 500 or other suitable I/O device may also be used to program and/or otherwise communicate with microprocessor 401. Sensor 204 and sensor 302 electronically communicate with controller 201. Power electronics 202 known in the art energize motor 30.

Figure 8:
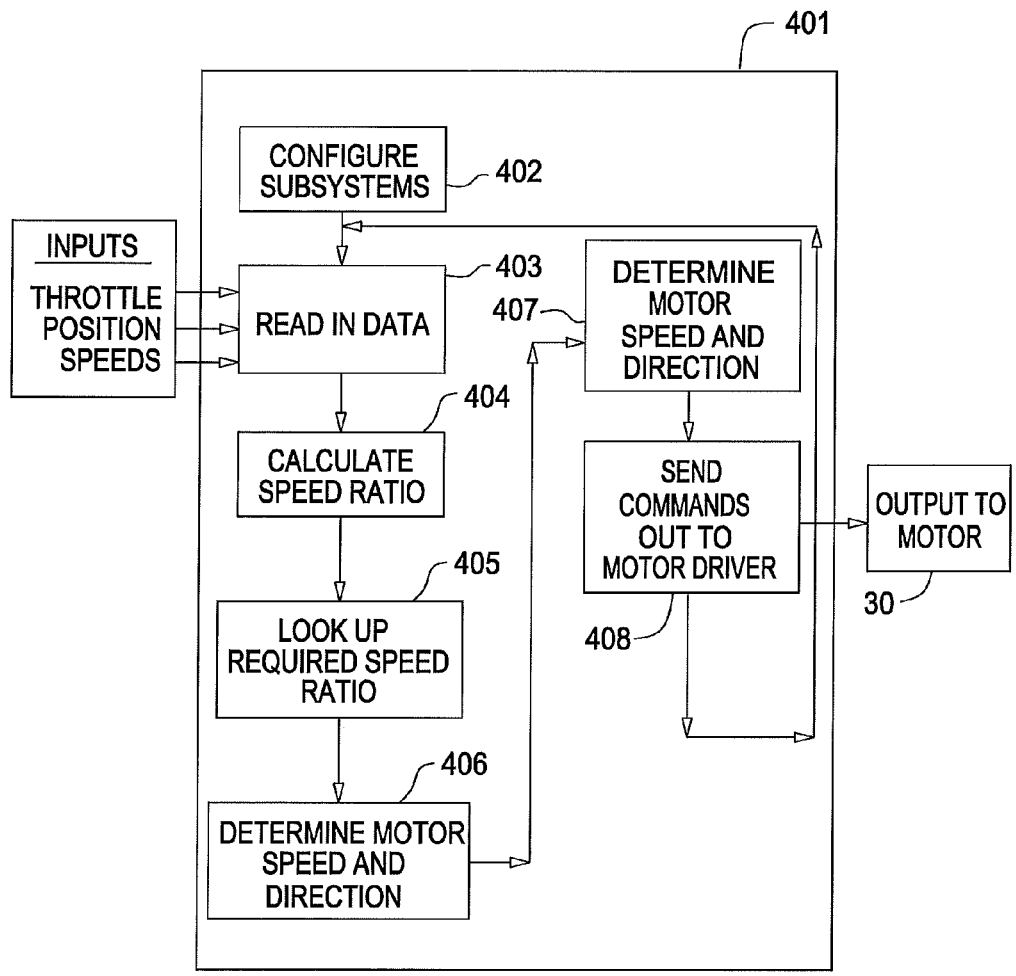
FIG. 8 is a control schematic of the CVT system.

FIG. 8 is a control schematic of the CVT system. A user configures the subsystems 402 in a manner known in the art. Engine/transmission system signals are input to the microprocessor at 403. The engine signals include throttle percentage, engine RPM and sheave position. The transmission signals include sheave position and RPM. The microprocessor calculates the speed ratio at 404. Given the inputs the microprocessor looks up the required speed ratio in a look up table 405. An example look up table is listed below.

| Throttle % | 301 Sheave RPM {800, 900, 1050, 1230, 1314, 1445, 2000, 2500, 3000, 4250, 5515, 6615, 7515, 8650} Speed Ratio × 100 (Driver/Driven) |
|---|---|
| 5 | {388, 363, 305, 264, 247, 225, 165, 132, 110, 72, 72, 72, 72, 72} |
| 10 | {388, 363, 305, 264, 247, 225, 165, 132, 110, 72, 72, 72, 72, 72} |
| 15 | {388, 363, 305, 264, 247, 225, 165, 132, 110, 72, 72, 72, 72, 72} |
| 20 | {388, 370, 311, 269, 252, 229, 165, 132, 110, 72, 72, 72, 72, 72} |
| 30 | {388, 388, 326, 282, 264, 240, 173, 139, 115, 72, 72, 72, 72, 72} |
| 40 | {388, 388, 357, 308, 289, 263, 190, 152, 126, 74, 72, 72, 72, 72} |
| 50 | {388, 388, 388, 335, 313, 285, 206, 165, 137, 80, 78, 72, 72, 72} |
| 60 | {388, 388, 388, 361, 338, 308, 222, 178, 148, 86, 84, 72, 72, 72} |

-continued

| 301 Sheave RPM {800, 900, 1050, 1230, 1314, 1445, 2000, 2500, 3000, 4250, 5515, 6615, 7515, 8650} | | | | | | | | | | | | | |
|---|---|---|---|---|---|---|---|---|---|---|---|---|---|
| Throttle % | Speed Ratio × 100 (Driver/Driven) | | | | | | | | | | | | |
| 70 | {388, | 388, | 388, | 386, | 363, | 330, | 238, | 191, | 159, | 93, | 90, | 72, | 72, | 72} |
| 80 | {388, | 388, | 388, | 388, | 388, | 353, | 255, | 204, | 170, | 99, | 96, | 77, | 72, | 72} |
| 90 | {388, | 388, | 388, | 388, | 388, | 375, | 271, | 217, | 180, | 105, | 103, | 82, | 72, | 72} |
| 100 | {388, | 388, | 388, | 388, | 388, | 388, | 287, | 230, | 191, | 112, | 109, | 86, | 76, | 72} |

The look up table may be customized by a user to accommodate the operating conditions of the vehicle. The values in the look up table are examples only and are not intended as limits. The microprocessor further determines the motor 30 speed and direction 407. The microprocessor signals 408 the motor 30 to change the position of sprocket depending on the desired speed ratio. The system then repeats the loop until the desired operating conditions are achieved.

Although a form of the invention has been described herein, it will be obvious to those skilled in the art that variations may be made in the construction and relation of parts without departing from the spirit and scope of the invention described herein.

I claim:

1. A CVT transmission comprising:
   a shaft (1) journalled to a housing (4);
   a first sheave (14) fixed to the shaft (1);
   a second sheave (12) moveable parallel to an axis of rotation (1A) of the shaft;
   the second sheave locked in rotating relation with the first sheave by a first sheave member (22) cooperatively engaged with a second sheave receiving member (12A), the second sheave receiving member comprising a slot disposed at a helical angle (HA) with respect to the axis of rotation;
   a sprocket (6) journalled to the housing;
   the sprocket threadably engaged (6B) with a movable member (26), a bearing (16) disposed between the movable member and the second sheave;
   the movable member engaged (5A) with the housing whereby movement of the movable member is parallel with the axis of rotation;
   an actuator (30) engaged with the sprocket; and
   the second sheave is axially movable through the helical angle upon a rotation of the sprocket.

2. The CVT transmission as in claim 1, wherein the helical angle is approximately 20 degrees.

3. The CVT transmission as in claim 1, wherein the first sheave member further comprises a roller having a roller axis of rotation (24A) that is normal to the shaft axis of rotation (1A).

4. The CVT transmission as in claim 1, wherein the actuator comprises a motor.

5. The CVT transmission as in claim 1, wherein the moveable member comprises a slot and the housing comprises a radial projection for engaging a slot.

6. A clutch system for a continuously variable transmission, the clutch system coupled to a shaft that is rotatable about a longitudinal axis, comprising:
   a stationary sheave coupled to the shaft;
   a movable sheave comprising a slot having a helical angle with respect to the shaft, and moveably coupled to the shaft, the movable sheave being helically movable with respect to said stationary sheave;
   a positional motor coupled to the moveable sheave and configured to cause said moveable sheave to move closer or further from the stationary sheave; and
   the moveable sheave and the stationary sheave coupled via the slot.

7. The secondary driven clutch system of claim 6, wherein the helical angle is in the range of about 5 degrees to about 50 degrees from the longitudinal axis.

8. The secondary driven clutch system of claim 7, wherein the helical angle is about 20 degrees when measured from the longitudinal axis.

9. The secondary driven clutch system of claim 6, wherein the stationary sheave is coupled to the slot via a roller disposed within the slot.

10. The secondary driven clutch system of claim 6, wherein the motor is coupled to the moveable sheave via a belt and gear drive system.

11. A vehicle comprising a continuously variable transmission system, wherein the continuously variable transmission system comprises:
   a stationary sheave coupled to a shaft;
   a movable sheave journalled about the shaft, the movable sheave being movable closer to or further from the stationary sheave along a helical longitudinal axis of rotation;
   a motor coupled to the moveable sheave and configured to cause said moveable sheave closer or further from the stationary sheave; and
   the stationary sheave and the moveable sheave coupled with a pin and slot, wherein said slot is generally at a helical angle from said longitudinal axis of rotation and said moveable sheave helically moveable with respect to said stationary sheave.

12. The vehicle of claim 11, wherein the angle is in the range of generally 5 degrees to generally 50 degrees from the longitudinal axis.

13. The vehicle of claim 12, wherein the angle is generally 20 degrees from the longitudinal axis.

14. The secondary driven clutch system of claim 11, wherein the motor is coupled to the movable sheave with slot via a belt and gear drive system.

\* \* \* \* \*